United States Patent
Campbell et al.

(10) Patent No.: US 7,747,941 B2
(45) Date of Patent: Jun. 29, 2010

(54) WEBPAGE GENERATION TOOL AND METHOD

(75) Inventors: Christopher S. Campbell, Santa Cruz, CA (US); Andreas Dieberger, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 10/323,147

(22) Filed: Dec. 18, 2002

(65) Prior Publication Data

US 2004/0123244 A1 Jun. 24, 2004

(51) Int. Cl.
*G06F 17/00* (2006.01)

(52) U.S. Cl. .................. 715/234; 715/235; 715/236; 715/255

(58) Field of Classification Search .......... 715/513, 715/501.1, 516–517, 522–523, 520, 500, 715/530, 230–233, 266, 268, 200, 255, 205, 715/234–236, 239; 1/1
See application file for complete search history.

(56) References Cited

U.S. PATENT DOCUMENTS

| | | | |
|---|---|---|---|
| 5,495,565 A | | 2/1996 | Millard et al. |
| 5,708,825 A * | | 1/1998 | Sotomayor ............... 715/501.1 |
| 5,899,975 A * | | 5/1999 | Nielsen ................. 704/270.1 |
| 6,012,098 A | | 1/2000 | Bayeh et al. |
| 6,026,433 A | | 2/2000 | D'Arlach et al. |
| 6,081,262 A * | | 6/2000 | Gill et al. ................. 715/500.1 |
| 6,085,219 A | | 7/2000 | Morlya |
| 6,088,702 A * | | 7/2000 | Plantz et al. ............. 707/103 R |
| 6,112,242 A * | | 8/2000 | Jois et al. ................... 709/225 |
| 6,185,587 B1 | | 2/2001 | Bernardo et al. |
| 6,219,680 B1 * | | 4/2001 | Bernardo et al. ......... 715/501.1 |
| 6,222,947 B1 * | | 4/2001 | Koba .......................... 382/284 |
| 6,247,032 B1 | | 6/2001 | Bernardo et al. |
| 6,256,650 B1 * | | 7/2001 | Cedar et al. ................. 715/517 |
| 6,263,352 B1 | | 7/2001 | Cohen |
| 6,282,548 B1 | | 8/2001 | Burner et al. |
| 6,308,188 B1 | | 10/2001 | Bernardo et al. |
| 6,324,545 B1 * | | 11/2001 | Morag ....................... 707/202 |

(Continued)

FOREIGN PATENT DOCUMENTS

WO    WO 02/01398 A2    1/2002

OTHER PUBLICATIONS

Miller et al., "System, Method and Article of Manufacture for Enabling Product Selection Across Multiple Websites", U.S. Patent Application Publication No. US 2002/0002496 A1, Jan. 3, 2002, U.S. Appl. No. 09/783,744.

(Continued)

*Primary Examiner*—Thu Huynh
(74) *Attorney, Agent, or Firm*—Daniel E. Johnson

(57) ABSTRACT

The creation and maintenance of a website is made easier through automation. The user selects the data (or documents) to put on the web. Information associated with the documents is extracted from the documents and analyzed to determine the contents of the documents. A template is then automatically selected from a library of templates, and this template is used to generate the website. Both the structure and the layout of the data may be determined from the data itself, from user actions, from corporate identity templates, and from authorities that can help improve the website design.

37 Claims, 12 Drawing Sheets

U.S. PATENT DOCUMENTS

| | | | | |
|---|---|---|---|---|
| 6,463,440 | B1* | 10/2002 | Hind et al. | 707/102 |
| 7,000,180 | B2* | 2/2006 | Balthaser | 715/240 |
| 7,016,963 | B1* | 3/2006 | Judd et al. | 709/228 |
| 7,134,073 | B1* | 11/2006 | Fiedorowicz et al. | 715/235 |
| 7,426,687 | B1* | 9/2008 | Schultz et al. | 715/208 |
| 2002/0019833 | A1* | 2/2002 | Hanamoto | 707/500 |
| 2002/0046235 | A1* | 4/2002 | Foy et al. | 709/203 |
| 2002/0069217 | A1* | 6/2002 | Chen et al. | 707/500.1 |
| 2002/0091733 | A1* | 7/2002 | Chen et al. | 707/509 |
| 2002/0095441 | A1* | 7/2002 | Lakhani et al. | 707/513 |
| 2002/0129067 | A1* | 9/2002 | Dames et al. | 707/523 |
| 2002/0135621 | A1* | 9/2002 | Angiulo et al. | 345/838 |
| 2002/0138513 | A1* | 9/2002 | Korotney et al. | 707/511 |
| 2002/0143818 | A1* | 10/2002 | Roberts et al. | 707/513 |
| 2002/0152245 | A1* | 10/2002 | McCaskey et al. | 707/530 |
| 2002/0152286 | A1* | 10/2002 | Peddu et al. | 709/219 |
| 2003/0014442 | A1* | 1/2003 | Shiigi et al. | 707/513 |
| 2003/0084405 | A1* | 5/2003 | Ito et al. | 715/513 |
| 2006/0047665 | A1* | 3/2006 | Neil | 707/10 |
| 2008/0178072 | A1* | 7/2008 | Fiedorowicz et al. | 715/235 |

OTHER PUBLICATIONS

Anonymous, "Advertisement placement in WML-based content", Research Disclosure article #443123, Mar. 2001, pp. 461-463.

Daniel M. Russell, "A Design Pattern-based Video Summarization Technique: Moving from Low-level Signals to High-level Structure", Proceedings of the 33rd Hawaii International Conference on System Sciences, Jan. 2000, p. 3048.

Kiyomitsu et al., "Web Reconfiguration by Spatio-Temporal Page Personalization Rules Based on Access Histories", IEEE Proceedings of Symposium on Applications and the Internet, 2001. pp. 75-82.

Kiyomitsu et al. "Active Web: XML-Based Active Rules for Web View Derivatives and Access Control", IEEE Proceedings of Workshop on Information Technology for Virtual Enterprises, 2001. pp. 31-39.

* cited by examiner

```
//globals
pageHorizontalSize   700   0
pageVerticalSize   40   0

//page1
fileNameCluster 100   0
fileTypeCluster 150   0
fileFolderCluster 10   0
maxLinkTextWords 5   0
maxLinkContentSummaryWords 200   0
maxNumberGroups 3   0
```

Fig. 3

```
if(((Float) rules.get("fileTypeCluster")).
    compareTo((Float) rules.get("fileNameCluster")) > 0) {

System.out.println("Ordering by type");
    TreeMap tm = new TreeMap();
    Iterator iter = selectedFiles.iterator();
    while(iter.hasNext()) {
        File file = (File) iter.next();
        String temp = (file.getName()).substring(
            file.getName().indexOf('.')) +
            file.getName();
        tm.put(temp, file);
    }
    selectedFiles.clear();
    selectedFiles.addAll(tm.values());
    System.out.println(tm.values());
}
```

Fig. 6

```
menuGroups.clear();
iter = selectedFiles.iterator();
int i = 0;
List group = new ArrayList();
boolean menu = false;
File fileold = (File) iter.next();
group.add(fileold);
while(iter.hasNext()) {
    File file = (File) iter.next();
    String currentType =
        file.getName().substring(
        file.getName().indexOf('.'));
    String oldType =
        fileold.getName().substring(
        fileold.getName().indexOf('.'));
    if(!currentType.equals(oldType)) {
        i++;
        if(i > ((Float) rules.get("maxNumberGroups")).
            intValue()) menu = true;
        if(menu) menuGroups.add(group);
        else fileGroups.add(group);
        group = new ArrayList();
    }
    group.add(file);
    fileold = file;
}
```

Fig. 7

```
if(i > ((Float) rules.get("maxNumberGroups")).
    intValue()) menu = true;
if(menu) menuGroups.add(group)
```

Fig. 8

```
StringBuffer webpage = new StringBuffer();
    webpage = createHeader();
    webpage.append("<BODY> \n");
    webpage.append("<TABLE ALIGN=\"LEFT\"
        BGCOLOR = \"#888888\" BORDER WIDTH=\""+
        (rules.get("pageHorizontalSize")).toString()+
        "\" > \n");
    webpage.append("<tr > \n");
    webpage.append("<th COLSPAN=2 > \n");
    webpage.append("This is my webpage <BR> \n");
    webpage.append("</th > \n");
    webpage.append("</tr> \n");
```

Fig. 9

```
String Type = file.getName().
    substring(file.getName().indexOf('.'));
Type = "My "+Type+" files";
```

Fig. 10

```
public String generateLink(File file) {
    String link = new String();
    URL name = null;
    StringBuffer linktext =
        new StringBuffer();
    int maxwords = ((Float)
        rules.get("maxLinkTextWords")).intValue();
    linktext.append("");
    try {
        name = (URL) file.toURL();
    } catch (Exception e) { e.printStackTrace(); }
    if(file.getName().endsWith(".txt") ||
        file.getName().endsWith(".doc") ||
        file.getName().endsWith(".rtf") ) {
        String text = readFile(file);
        StringTokenizer st = new StringTokenizer(text);
        for(int i = 1; i <= maxwords ;i++) {
            String token = st.nextToken() + " ";
            if(token.length() < 17)
                linktext.append(token);
            else i--;
        }
    }
}
```

Fig. 11

```
    String Type = file.getName().
        substring(file.getName().indexOf('.'));
    Type = "My "+Type+" files";
    webpage.append(generateLink(Type, (Type+".html")));
```

Fig. 12

```
public String generateLink(String name, String location) {
    String link = new String();
    StringBuffer linktext = new StringBuffer();
    linktext.append(name);
    link = "<a href = \"" + location +
        "\">" + linktext + "</a> <BR> \n";
    return link;
}
```

Fig. 13

```
webpage.append("<tr> \n");
webpage.append("<td> \n");
webpage.append("<b> Menu </b>\n");
webpage.append("<br > \n");
webpage.append("<FONT SIZE=2> \n");
Iterator iter = menuGroups.iterator();
while(iter.hasNext()) {
    List files = (List) iter.next();
    File file = (File)files.get(0);
    String Type = file.getName().
        substring(file.getName().indexOf('.'));
    Type = "My "+Type+" files";
    webpage.append(generateLink(Type, (Type+".html")));
}
webpage.append("</ul > \n");
webpage.append("</td> \n");
```

Fig. 14

```
webpage.append("<td > \n");
webpage.append("<ol COMPACT > \n");
iter = fileGroups.iterator();
while(iter.hasNext()) {
      List files = (List) iter.next();
      Iterator fileiter = files.iterator();
      while(fileiter.hasNext()) {
      webpage.append("<li > \n");
webpage.append(generateLink((File)fileiter.next()));
            webpage.append("</li > \n");
      }
      webpage.append("<p > \n");
}
webpage.append("</ol> \n");
webpage.append("</TD> \n");
webpage.append("</TR> \n");
```

Fig. 15

```
writeFile((dataDirectory+"index.html"), webpage);
```

Fig. 16

WEBPAGE GENERATION TOOL AND METHOD

TECHNICAL FIELD

The invention is in the field of webpage design. More particularly, the invention relates to the ability to automatically generate and maintain webpages without significant user input.

BACKGROUND

The advent of the World Wide Web (the "web") has presented the public with access to an unprecedented amount of easily available information. This has made publishing information on the web attractive for those who wish to disseminate information rapidly and widely. However, it is generally difficult for novice users to publish information on the web since (1) technical skill is required to set up and maintain a website, and (2) a great deal of effort is required to organize and generate information in an aesthetically pleasing way. Thus, the time required to create and maintain a website has become for many a significant problem. For example, even if a user only wants to put a few photos on the web with a minimum of comments, he or she must typically invest considerable time and effort to resize the photos, create thumbnails, and make sure the comments appear properly next to each picture. Likewise, if a busy professional wants to "share" information online (i.e., place information on the Internet or an intranet) about his or her career in order to advertise skills or to attract colleagues with similar interests, he or she may spend an entire day just creating the website, and consequently lose interest in adding information to the site later or in keeping it up-to-date. Users learn quickly that creating websites is "hard" and is not worth the trouble. Furthermore, the degree to which many "homemade" websites are not user friendly has been a central topic of discussion among website usability and design professionals; many websites lack even the most basic accessibility support to make them readable by visually impaired persons, for example.

One tool for streamlining the website creation process, which was developed by IBM, is called "uServ". Briefly, uServ makes the details of publishing information (such as learning HTML, Javascript, FTP, and so on) invisible by allowing users to put information on the web by simply right-clicking on a file and selecting "publish". This spares the user from having to learn an excessive number of technical details regarding webpage creation. However, it does not make it any easier to give the website a desired appearance or layout, which in itself can be a time-consuming and difficult process. Although GUI editors in uServ help speed up the process, the user must still perform detailed work that involves decisions about color scheme, the number and size of photos (if they are used), how to make the site "useable" or "accessible", and so on.

Many programs are available that allow for drag and drop and WYSIWYG ("What you see is what you get") methods for creating webpages, such as Netscape Composer and Dreamweaver. Using these methods, one can select, for example, a horizontal border, a headline object, or a link object and place it on the webpage. However, the user must still fill out a form indicating text, color, and size for many of the objects, and the link object requires the user to type in the path to the linked data for every piece of data. If the user wishes to share, say, 30 documents, this can be time consuming, as it is still quite difficult to associate data with the layout of the website. In short, these programs are best suited for web developers who create professional websites.

Automatic webpage builders, which are available on the web, give the user a form to fill out and then automatically create a webpage from that form. These tools can create standard HTML webpages (see, for example, the Internet web site whose address is given by the concatenation of "http://", "www.", and "webspawner.com/create.html", and the Internet web site whose address is given by the concatenation of "http://" and "geocities.yahoo.com/home/") or more attractive Macromedia FLASH websites (see, for example, the Internet web site whose address is given by the concatenation of "www." and "moonfruit.com"). While these tools simplify the process of creating a website, they do not automate the process of sharing and formatting the layout of documents or other data. The user typically must upload each file to a server and then give details of how the data will be presented, e.g., what the link anchor text will be (i.e., the text that appears to the user as the hyperlink), whether it is a bullet list for each file, and so on. Many of these tools also force the user to choose a template for the layout of the website before entering any information. Like webpage design software, automatic webpage builders require the user to 1) learn how to use some particular tool or software to create a website, 2) manage how the shared information is presented on the site, and 3) choose a template for the overall structure of the website.

Enterprise collaborative tools (see, for example, the Internet web site whose address is given by the concatenation of "www." and "opentext.com", and the Internet web site whose address is given by the concatenation of "www." and "groove.net") are intranet solutions to sharing data within an enterprise. They make sharing documents very easy, but do not automatically create the layout of the data for browsing. One tool (see the Internet web site whose address is given by the concatenation of "www." and "opentext.com") has a search engine interface that is used to find and present documents. Another tool (see the Internet web site whose address is given by the concatenation of "www." and "groove.net") creates team or workgroup "places" in which documents or other data can be shared. These documents are typically placed into a "documents" or "data" folder associated with the team or project and are not organized based on any type of metadata. Also, the user is required to setup and maintain these workgroups as well as the files in them (e.g., delete old files, update files that have changed, add new folders, and so on).

There remains a need for automating the process of creating and maintaining a website.

SUMMARY OF THE INVENTION

Preferred implementations of the invention are designed to make the creation and maintenance of a website easier through automation. Rather than having to learn how to design a website, how to create HTML, and how to use tools for website design, the user simply selects the data to put on the web, and an appropriate layout and structure of the website are generated automatically. Both the structure and the layout of the data may be determined from the data itself, from user actions, from corporate identity templates, and from authorities that can help improve the website design. This automation of both the template selection and layout of the details allows the user to share and present information quickly and easily. In preferred implementations, there is provided an automated method to present and manage shared information, in which templates may provide multiple views of that information on a website differently to different users, and in which metadata creates associations between files that leads to useful presentation of documents in the website.

In preferred implementations of the invention, documents are analyzed and an appropriate navigational structure and layout for these documents are determined based on well-known webpage genres (such as photo album, list of talks, publication list, and so on). Since these structures are created automatically, it is possible to make collections of information accessible on the web in a negligible amount of time— even while talking on the phone to someone about the webpage to be constructed, for example. One advantage of preferred implementations is that a website can be incrementally improved, e.g., by annotating a list of publications after it has been put on the web, without having to rework the entire design. This is especially useful to users that can not design a website due to physical disabilities but still wish to communicate and share information over the web. A further advantage of preferred implementations is that sites created by individuals may be more easily blended with existing corporate webpages, a goal that is difficult to achieve for users who do not have the right tools and (graphical) assets for creating webpages that adhere to specific corporate design guidelines.

One preferred embodiment of the invention is a computer program product that includes a computer-readable medium that tangibly embodies a computer executable program thereon. The program automatically lays out at least one document's information on at least one webpage, and includes instructions for automatically selecting a particular template from a library of templates, in which the particular template is selected according to information associated with the document. The program dynamically adapts the particular template, thereby permitting information in the document to be-integrated into a webpage. The template selection may be based on metadata associated with the document or on information in the document itself.

One preferred implementation of the invention is a method of constructing a webpage that includes extracting information associated with at least one document. The method further includes analyzing the extracted information to determine the contents of said at least one document, selecting a template from a library of templates according to the contents of said at least one document, and generating at least one webpage from the selected template and said at least one document, in which the selecting is performed by computer program code residing within at least one processor. The selecting may advantageously depend in part on preferences input by a user, but the selecting is preferably performed without input from a user after said extracting. The library of templates may reside on a template server, with said at least one document being provided (e.g., by a user of the method, a colleague of the user, a team or work group, or by an automated system or computer program) to a client machine that communicates with the template server. In another preferred implementation, said at least one webpage is generated on a server that communicates with both the template server and the client machine. A plurality of webpages may be generated to form a website, with hyperlinks being advantageously formed on the webpages to link the webpages to each other.

The method may further include merging the selected template with a default template to form a completed template from which said at least one webpage is generated. The merging may include a stepwise process in which rules in the default template are compared with corresponding rules in the selected template, with the rules with the highest priority being selected to be included in the completed template. In one preferred implementation, a plurality of selected templates are merged with each other or with a default template to form a completed template from which the webpage is generated. The method may be used to maintain a previously constructed website; in this case, the method may have been previously used to generate the default template, which is then used by the method to generate an updated website. The one or more documents may be stored in a database to which documents are added. The method may further comprise extracting information from at least one document that had been previously stored in the database, with said at least one previously stored document being stored in the database.

Another preferred embodiment of the invention is a computer system that includes at least one processor and a memory in electronic communication with said at least one processor, in which the memory includes software instructions designed to enable the computer system to perform certain methods. A preferred one of these methods includes the acts of extracting information associated with at least one document, analyzing the extracted information to determine the contents of said at least one document, selecting a template from a library of templates according to the contents of said at least one document, and generating at least one webpage from the selected template and said at least one document. In a preferred embodiment, said at least one processor includes a template server and a client machine that communicates with the template server, in which the library of templates resides on the template server, and said at least one document is provided to the client machine (e.g., by a user). Alternatively, said at least one webpage may be generated on a server that communicates with both the template server and the client machine.

In other preferred implementations of the invention, there are provided computer program products for carrying out any of the methods herein.

BRIEF DESCRIPTION OF THE DRAWINGS

FIG. 3 is an example of a small rule set that may be associated with a template.

FIG. 6 depicts a set of machine instructions for ordering documents in accordance with the process of FIG. 4.

FIG. 7 depicts a set of machine instructions for grouping documents in accordance with the process of FIG. 4.

FIG. 8 depicts a set of machine instructions for selecting the number of webpages to be included in a website in accordance with the process of FIG. 4.

FIG. 9 depicts a set of machine instructions for creating a title banner in accordance with the process of FIG. 4.

FIG. 10 depicts a set of machine instructions for generating group headings in accordance with the process of FIG. 4.

FIG. 11 depicts a set of machine instructions for generating link anchor text in accordance with the process of FIG. 4.

FIG. 12 depicts a set of machine instructions for generating menu links in accordance with the process of FIG. 4.

FIG. 13 depicts a set of machine instructions for generating document links in accordance with the process of FIG. 4.

FIG. 14 depicts a set of machine instructions for creating a menu bar in accordance with the process of FIG. 4.

FIG. 15 depicts a set of machine instructions for creating a content panel in accordance with the process of FIG. 4.

FIG. 16 depicts a set of machine instructions for creating HTML in accordance with the process of FIG. 4.

DETAILED DESCRIPTION OF THE INVENTION

Preferred implementations of the invention provide the user with the ability to automatically generate a webpage or even an entire website (i.e., a collection of interrelated webpages, including hyperlinks between the pages), and easily maintain it. The layout of a webpage from certain files is generated automatically based on information such as (a) user preferences—e.g., specifying that all document files be on a "publications list" page, (b) company context—e.g., if the website is within a corporate intranet, the company may have rules as to how the websites should appear, (c) workgroup context—e.g., rules specific to a workgroup, and (d) meta-data or other information associated with the files, such as which files have been recently modified. This metadata may also include filesystem-attributes (e.g., directory structure, filenames, and location of the file in the filesystem) and interaction attributes (e.g., frequency of file usage, what application is used with the file, what group of files were modified "together", and what group of files was published to the web at the same time). Likewise, meta-data such as size, content, type of file, and the application associated with the file type can also be used to associate files with each other. Generally, templates that can be used in the automatic generation of a website can be obtained from such sources as (a) one's personal database, (b) a corporate database, (c) a workgroup database, and (d) the Internet or some other authority on website design.

Figure 1:
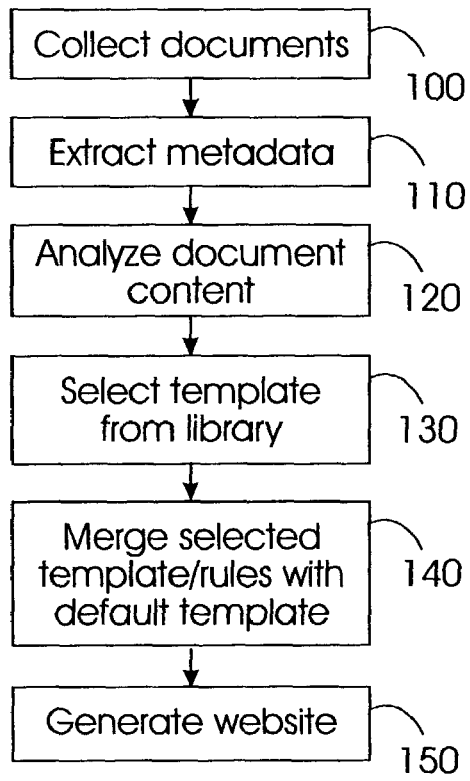
FIG. 1 is an overview of a preferred method for automatically laying out a website.

Preferred implementations of the invention are now described. As shown in FIG. 1, the user makes available certain documents to be placed on a website, which are then collected by the software and stored in a database (step 100) for analysis and for presentation in an appropriate layout, e.g., the documents may be copied from a client machine and placed in a database for analysis. For example, a user may select a document or set of documents in his or her computer file system GUI (i.e., the explorer in Windows). The user can also share "raw" data such as text on the screen or Excel graphs. For example, the raw data may be selected with a mouse, and then by right clicking on the selection a menu is brought up in which "share" (i.e., for publishing on a webpage) is an option. When the selection is shared, the system automatically creates a file and puts the selected contents into the file. Then, a link to the file is put on the website. If the user wishes to select information appearing in the window of an open application or browser, the window may be selected and copied as an image, so that the selected information is added to the website.

If the collected documents are being added to an existing website, the collected documents are pooled with or added to those previously identified documents that define that existing website, with these documents being stored in a database.

By way of example, a set of files and/or documents, or a folder with files and/or documents may serve as the input to be collected. Metadata associated with these collected documents (and/or previously identified documents) is then extracted (step 110), and the (digital) content of the collected documents (and/or previously identified documents) is analyzed (step 120), so that the information associated with these documents may be appropriately presented on the website. The analysis of the documents is preferably broad based enough to determine the content of the document, e.g., whether there are photos (and if so how many), whether the document includes a publication list (and if so the authors and titles of the publications), what the key words in the document are and their frequency of use, and so on.

Depending on the type of information to be presented on the web, it is possible to select an appropriate webpage genre in which the corresponding template is automatically selected from a library of templates (step 130). For example, when publishing (on the web) a number of files that look like academic publications, the system can automatically determine that the genre "publication list" is appropriate. Based on user preferences or selection (e.g., input provided by a user at program startup or after sharing a set of documents), the system can then determine the desired variant of the genre, e.g., a publication list sorted by author, by year, or by topic, if that information is available from the meta-data, so that the appropriate publication list can be generated and placed on the web. (One way to implement this method is to rely on a threshold for the number of documents or the fraction of them that are actually publications; if this threshold is exceeded, then the publication list template is selected.) Alternatively, this information can be provided by the user using a special software interface. Another example is that of publishing a directory of files that are mostly images (photos). Here, the most appropriate genre is "photo album", so the photo album template is used to automatically resize the images, create thumbnails, and provide names under each thumbnail with the available meta-data (e.g., the filename). Other types of subject matter suitable for a template in the library include a project list, current work activities, presentations, a homepage, a resume, a corporate or employee directory, a playlist, workgroup contacts, and workgroup projects. Templates may also be designed for the vision impaired and for low-bandwidth connections. The history of the information being presented on the webpage may be automatically maintained by the system in a database by including a thumbnail, timestamps, a link to a full size screen shot, and a link to the original webpage; this history itself may be used in generating the layout of the website.

Thus, a template defines how a set of files or documents will be presented on one or more web pages. The system analyzes the documents or data to be shared (steps 110, 120) and determines the most appropriate representation and navigation structure for these documents (step 130) based on the kind of information at hand, e.g., based on the genre of information, on user input, and on user preferences the system has learned from earlier interactions with the system. For example, when a user shares pdf files, it is possible to determine the genre of the document (e.g., resume, project report, journal paper). Based on the genre, a template is selected that determines how the layout will be generated from the files that have been selected to be shared. In the case of a resume, the document may be laid out as a single, integrated document. If the user wishes to present a number of journal papers, these documents could be advantageously presented in the form of a publication list. The list may be further structured by author, by year, or by keywords, as desired. Note that finetuning the presentation of the documents can be performed incrementally as new documents are shared. Examples of the kind of material that can be incorporated into a website, based on document content, include a list of powerpoint files sorted by project or date, a publication list, a photo album, a version history of source code files or design documents, music files, memos, sketches or meeting notes sorted by date and project, and sales reports by date and/or department.

As used herein, a (layout) template is a set of layout rules, but individual rules may be modified if warranted by the files/documents that are being published. For example, if an image to be placed on the webpage is larger than what can be accommodated by the rules in the template, then the specific rules may be adjusted to allow the image to be fit on the webpage. The initial set of rules for generating a website advantageously have default values, and correspond to a default template. When a user publishes a set of files and/or documents, a template (set of rules) is selected (step 130), and additional rules may be changed as well. The values of all these rules replace the default values in a default template, if one is used. (In some cases multiple templates may be selected and merged to form a completed template that is then used in generating at least one portal or webpage.) In some cases, not all of the default values will be replaced because the templates need not specify all the rules. When the user publishes additional files and/or documents, the template can be dynamically adapted (i.e., modified or updated at least in part in response to new information, thereby resulting in a revised template of the same type) to account for the new information by modifying specific rules. (In this way, the user can quickly update a webpage with new content.) This process of merging the default template with a selected template and its associated rules based on a user's input (step 140) is discussed in greater detail below in connection with FIG. 2. If a default template is not used, and a single template is selected, then no merging is needed and the webpage can be generated from the single template.

The rules that define a template are used to associate digital information and metadata of the shared documents with the layout of website. Each rule preferably contains only one association and has a priority. When templates are merged and there is a conflict between rules, the rule with the highest priority is chosen, as discussed below. In a preferred implementation, the rules are stored in a template file and consist of a unique name, a parameter, and a priority. The rule action is implemented in the program code. An example of a small rule set is shown in FIG. 3.

The rule "fileNameCluster" indicates the degree to which links to the shared documents are grouped by filename. The rule "fileTypeCluster", on the other hand, indicates the degree to which links to the shared documents are grouped by file type. Thus, according to the parameters of these two rules, the links will be grouped by type first and then name. These rules determine the ordering layout element, and ordering is associated with filename and type meta-data. Also, the value for the horizontal size is 700, with a priority of 0.

The templates defined by the rules "map" the data to be shared (published) on the web to the layout of the website, to webpages within that site, and/or to hyperlinks in each webpage, i.e., they effectively generate the website (step 150). The templates can represent the needs and interests of the user solely, or may reflect the interests of an enterprise, a workgroup, or other external organizations. A website can be generated that uses several templates, e.g., a different template may be used for each webpage. Thus, data shared on the web may include a webpage based on a homepage template and another webpage based on a corporate profile template.

The system can then automatically provide an appropriate hyperlink between these two webpages. The generation of a website (step 150) is discussed below in greater detail in connection with FIG. 4.

Figure 2:
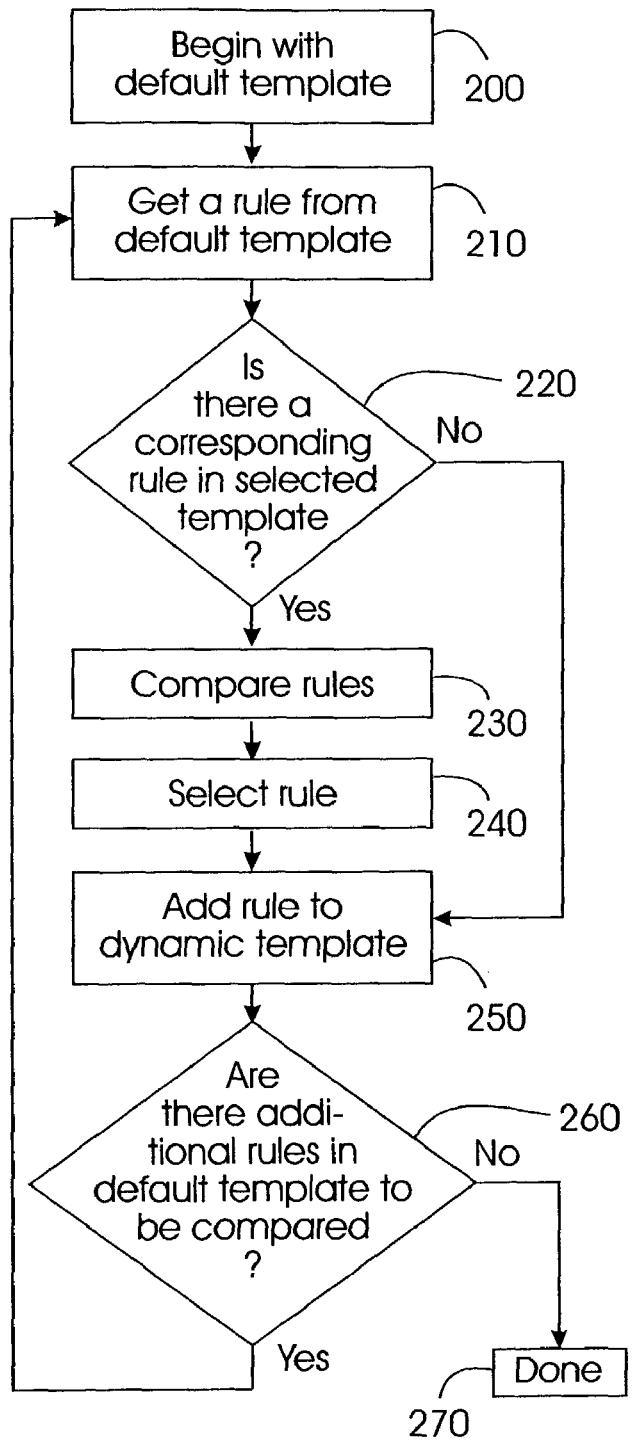
FIG. 2 is a flowchart of a preferred process for merging a template selected from a library of templates with a default template, resulting in the construction of a final template to be used in the construction of a website.

FIG. 2 illustrates a preferred method for merging (step 140) a selected template with a default template, which is provided (step 200) initially by the software used for implementing the method. The default template is defined by a set of rules, just as the selected template is defined by a set of rules. As a first step in the merging process 140, a rule from the default template is picked out (step 210), in order to determine (step 220) if there is a corresponding rule in the selected template that was chosen in step 130. If not, then the rule is added (step 250) to a dynamic template to be used in construction of the webpage. If there is a corresponding rule in the selected template, then these rules are compared (step 230), so that the rule with the highest priority is selected (step 240; this is important in the event that multiple templates are selected and conflicts between rules exit—in the event that only one template has been selected, its rules will supersede those in the default template) and added (step 250) to the dynamic template. If it is determined (step 260) that there are still additional rules in the default template to be compared, then an additional rule in the default template is picked out (step 210) and the process is repeated, as indicated in FIG. 2. Otherwise, the dynamic template is complete (step 270), and this constructed template and is used to generate the website. (It is preferred that all the rules in the selected template have counterpart rules in the default template.) In the event that more than one template is selected and no default template is used, then the rules are merged by comparing all rules of a type from all the selected templates, and selecting that rule having the highest priority.

The rules in a selected template generate not only the website, but also define the layout of that website. The term layout refers to the visual, auditory, and/or tactile representation of data in which certain aspects of the information is highlighted given certain constraints. Layout is determined for websites, webpages, and hyperlinks. For webpages, the layout is how the links, text, and other elements are arranged and highlighted. Some layout features that may be used on a webpage include emphasis/de-emphasis (e.g., italics, bold, caps, font size, font color, animation, and sound), the use of space (e.g., through grouping, isolation, flow, and texture), order (e.g., whether items are listed and their location on a page), labels (e.g., links to anchor text, bullets, numbers related to a list, directional arrows, break markers, and tables), and animation (e.g., scrolling and fading). For hyperlinks, the layout includes how the link is presented. This includes, for example, the anchor text words, the color of the hyperlink, and any animation or sound made when the cursor passes over the hyperlink.

Figure 4:
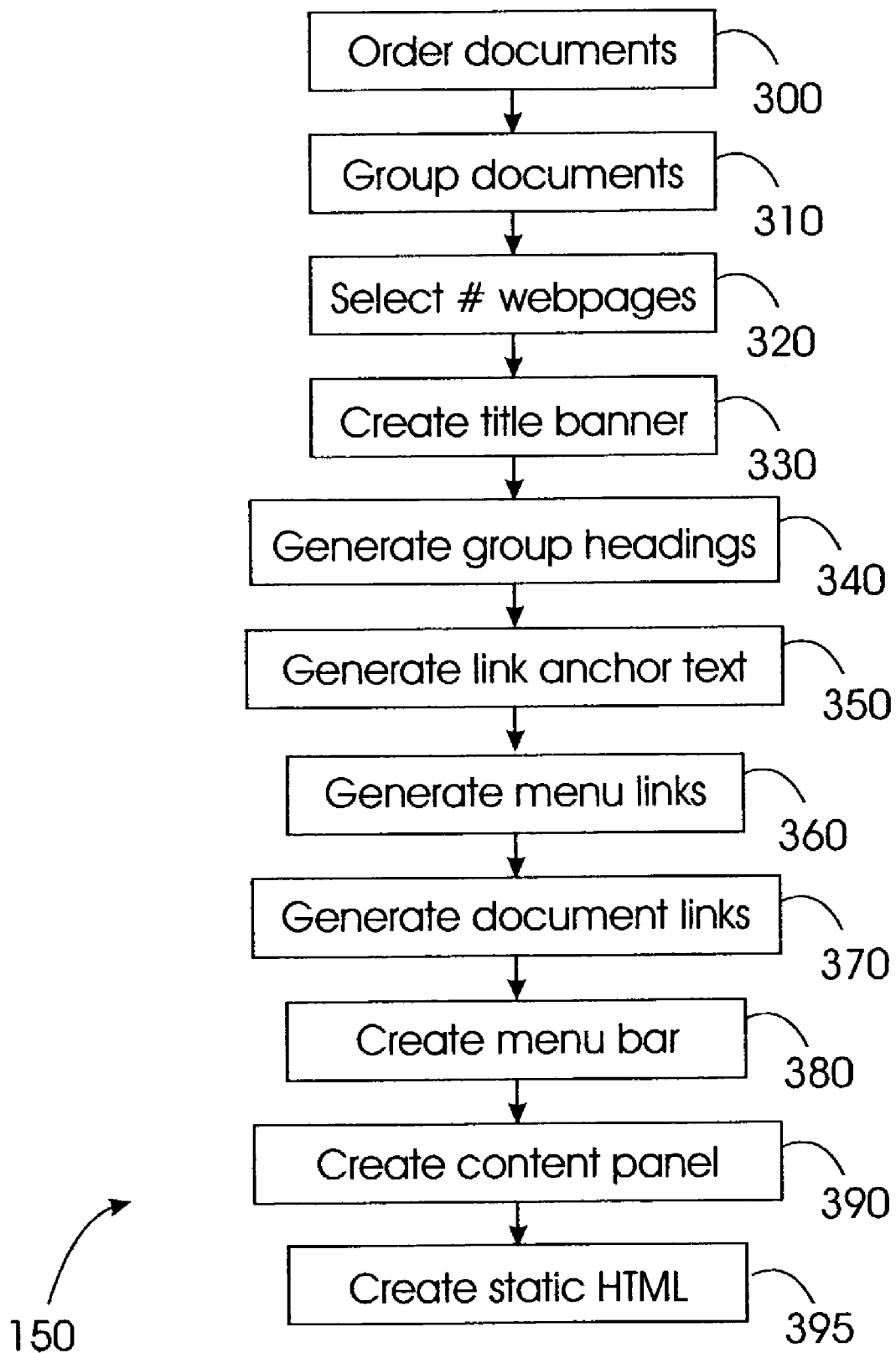
FIG. 4 is a flowchart of a preferred process of constructing one or more webpages in view of the final template generated by the process of FIG. 2.

A preferred process for generating a website (step 150), including its layout, in view of the final version of the dynamic template (constructed, for example, as indicated in FIG. 2), is now discussed in greater detail in connection with FIG. 4. Each of the steps outlined in FIG. 4 may be implemented as a JAVA method, for example. The documents that have been collected and stored in the database (step 100) as well as any previously identified documents that define an existing website are ordered (step 300), i.e., the hierarchical relationship between the documents is established as it is to be experienced by the user through the use of hyperlinks. Documents are then grouped or associated (step 310) with each other prior to selecting (step 320) the number of webpages on which those documents are to appear. For example, a photo album template may create one main page that has the user's photo and contact information and then a link on that main page to a set of webpages with thumbnails. If there are only a limited number of photos to be published and those photos can fit comfortably onto a single webpage, then the template simply adds those photos to the main page without creating additional webpages.

Figure 5:
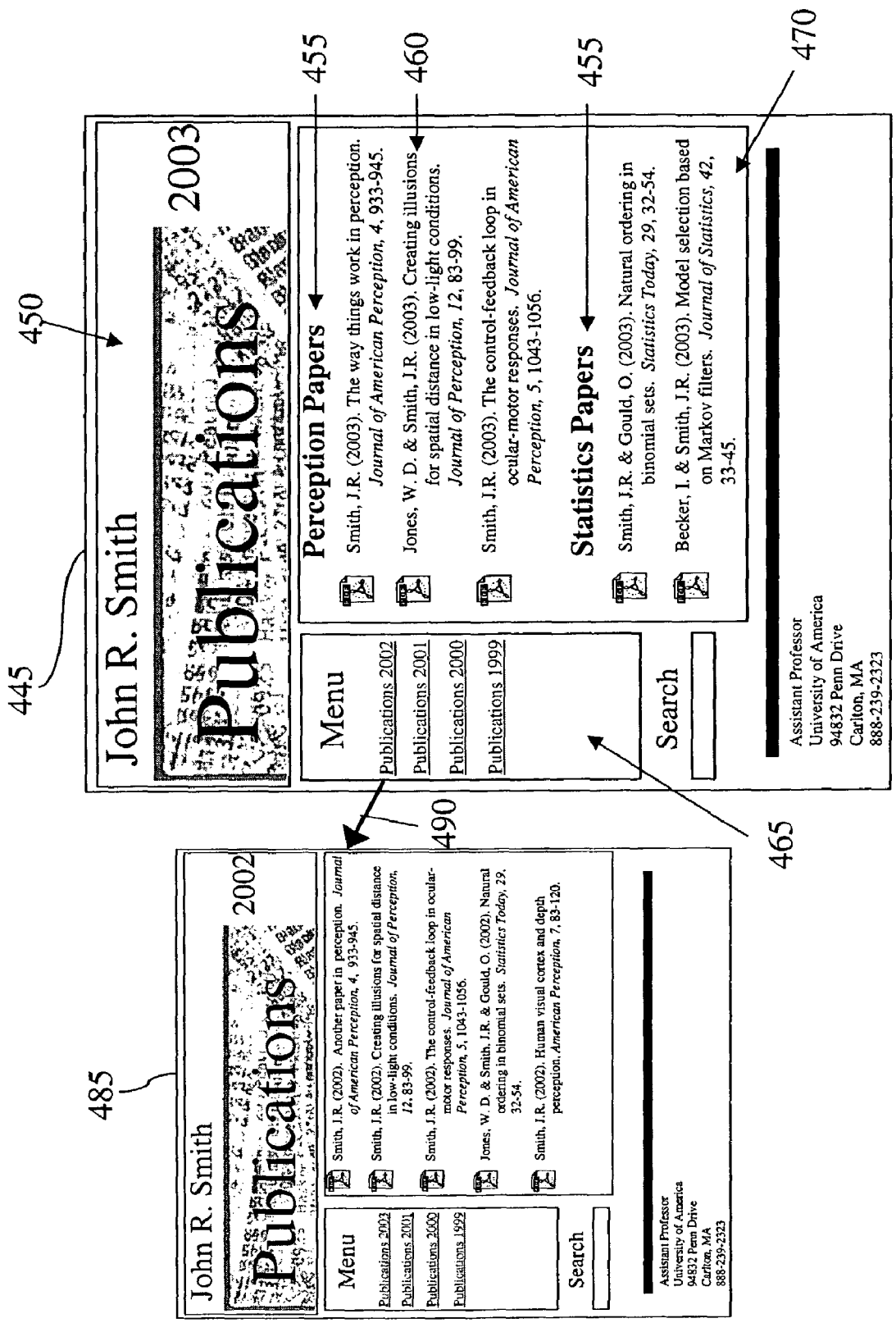
FIG. 5 shows webpages that include features that may be generated in accordance with the methods herein.

A title banner or main heading for the website is created (step 330), and headings for the groups of documents are generated (step 340). Information in the documents themselves is added to the website, with link anchor text being generated (step 350). The documents may be scanned for text that suggests the topic of each document, with that text being used as anchor text for the link. For example, if the document is a research paper, then the title or the first sentence of the abstract generally provides a good indication of the topic. If the document is binary data or an image that has no text, the filename may be used instead. In preferred embodiments of the invention, the user can go back and correct the anchor text later if desired. Menus and the links on those menus are generated (step 360), and links between the documents are also created (step 370). Appropriate menu bars are likewise created (step 380), as well as a content panel (step 390). The static HTML needed to make the website work is then created (step 400). FIG. 5 shows a webpage 445 that is generated as a result of this process, in which the webpage includes a title banner 450, document headings 455, link anchor text 460 (which when clicked takes the user to the selected document), and a menu 465. In this example, clicking on "Publications 2002" leads to another webpage 485 for this website, as indicated by the arrow 490. Examples of program code that correspond to the steps of FIG. 4, namely, steps 300, 310, 320, 330, 340, 350, 360, 370, 380, 390, and 395, are shown in FIGS. 6-16, respectively.

In a preferred embodiment, rules and templates can be modified by various parties to organize information in an enterprise specific manner, e.g., enterprise wide or department wide. For example, a company can redesign its templates and in so doing have all its corporate websites change to the new design. Thus, departments can place links on employee websites to the main department website. If companies need to know, for example, what work has been completed in the last quarter, a template can be modified to generate a new webpage with that information. Templates may be imposed on the user, as in the case of a corporate intranet in which each website must meet certain-guidelines. Multiple templates can also be used to create multiple "views" of the same website. For example, a company may prefer a directory view of an employee's website with the relevant contact information, but the employee may prefer to have his or her publications list displayed prominently to facilitate adding references to that list and to provide colleagues with a single URL for his or her work.

Figure 17:
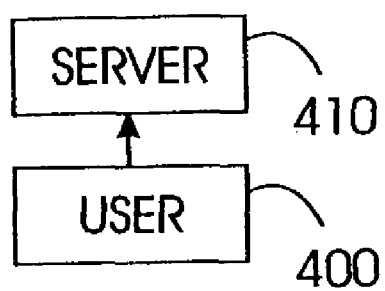
FIGS. 17-19 outline various relationships between a user, a client, and a server in embodiments that may be used in implementing the methods herein.

FIG. 17 shows a user 400 interacting with a webserver 410 onto which has been loaded a program containing instructions for carrying out one or more of the methods disclosed herein. In this embodiment, the server 410 preferably also includes a library of templates, which may be included in the program itself or be in a database that is in communication with the program.

Figure 18:
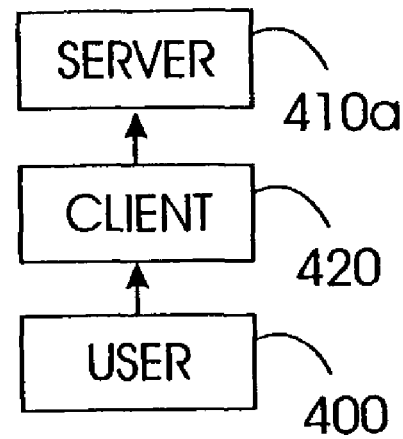

In the embodiment shown in FIG. 18, the user 400 interacts with a client 420 to specify which documents will be shared. The client 420 may be a PDA (personal digital assistant), processor, or a computer such as a PC. The client 420 is in electronic communication with a webserver 410*a* onto which is loaded a program containing instructions for carrying out one or more of the methods herein. The webserver 410*a* collects data shared by the client 420 and generates a website.

The data provided by the user may reside exclusively in the client 420, or the data may be electronically transferred to the server 410*a*. In an alternative of the embodiment shown in FIG. 18, the user 400 may interact with a client 420 that has a program loaded thereon for constructing a website in accordance with one or more of the methods described herein, with the constructed website being transferred from the client 420 to the webserver 410*a*. In each case, the library of templates is preferably included with the program or resides in a database in communication with the program.

Figure 19:
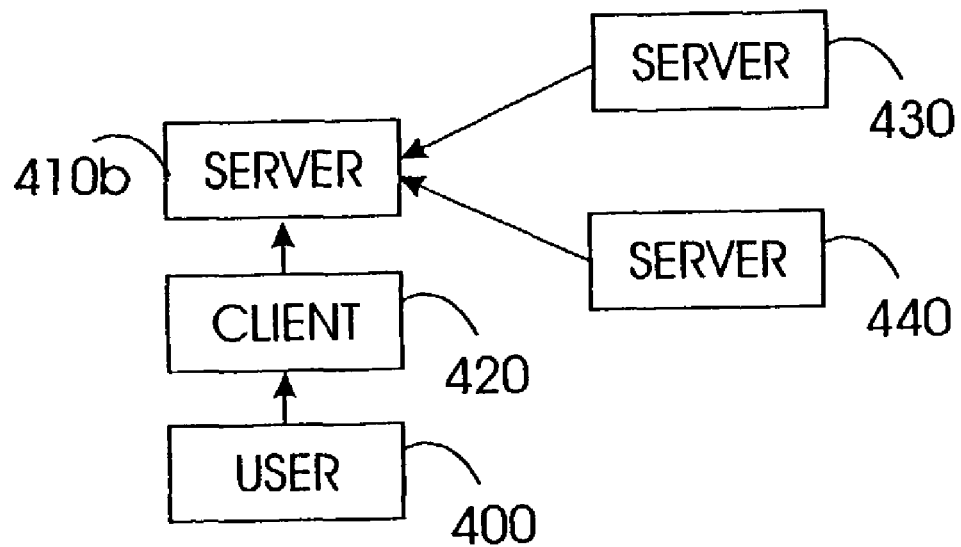

FIG. 19 shows another embodiment, in which a user 400 interacts with a client 420 such as the one described above in connection with FIG. 18. The client 420 is in electronic communication with a webserver 410*b* that in turn is in electronic communication with one or more servers 430 that act as a database or library for templates to be used in the construction of a website. The webserver 410*b* is in turn in electronic communication with one or more servers 440 on the World Wide Web and has a program containing instructions for carrying out one or more of the methods herein. With respect to the embodiments shown in FIGS. 17-19, the servers 410, 410*a*, and 410*b* may be, for example, a corporate intranet server, local area network server, or a World Wide Web server.

One advantage of preferred embodiments is that users can publish information rapidly without it necessarily being complete, i.e., they can return to their website or webpage later and supply additional information when it becomes available. For example, a user can post a few papers on-line in a publication list without specifying any further details, so that these publications become online "as is". The user can return later and assign annotations and keywords to these publications, or specify that the background should be blue instead of black. The system can also revise the website when files are updated or new files are added. For example, if the files to be shared only include two publications, they can be placed on the main page (the home page) of the site. However, when the list of publications becomes longer than can be maintained on the home page, the system can farm the publication list out to a separate page that is linked into the home page.

Another advantage of preferred embodiments is that they allow documents to become accessible without, for example, the delay that is typically involved with email attachments. This is useful in situations where two people on conversing on the phone and wish to share information more or less instantaneously, with the confidence that the shared information has a reasonably professional look and an adequate navigational structure that is appropriate for the information being shared. In a typical enterprise setting, the system can be preconfigured to apply a standardized "look" to the resulting page or pages, so that the resulting website can be linked directly into a corporate site, if that is desired.

Still another advantage of preferred implementations of the invention is that they permit incremental improvements/modifications of material already posted on a website. For example, after quickly sharing a few documents during a phone conference by placing them on a website, the owner of the documents can come back later and annotate the documents or provide a different type of layout. Already generated webpages may thus be incrementally changed as often as is desired or required, so that the user is not forced to redesign the entire site. For example, using tools currently on the market, when generating a photo album from a folder of image files, the photo album has to be regenerated from scratch when changing from 3 columns of thumbnails to 4 columns. All previous modifications or annotations to the album typically get lost in this process, a problem which is obviated using preferred methods described herein.

Automatically creating the layout of a website would be very useful for those with visual impairments, even if they themselves would not be able to use this visually oriented layout. This would allow, for example, non-sighted users to create and share information more easily with sighted users. Preferred embodiments allow visually impaired users to select a set of files, with the system then automatically creating a website or adding the files to a preexisting website. In case of a group site where every colleague maintains a section of the site, the system can ensure that all sections of the site (including contributions from a visually-impaired user) would have a consistent design and seamlessly blend together. Visually impaired users can also create websites designed for other visually impaired users. In this case, the system can use templates that produce, say, large fonts, to make the site readable by visually impaired users. The system can also have a template that creates webpages with lists that are read aloud to blind users.

Enterprises can use preferred embodiments to facilitate knowledge management and information sharing on internal intranets. Enterprises can also use the invention to present internal documents and information in a consistent and professional way by imposing rules on layout generation. For example, a company can require that all employees share data on the company intranet. When employees publish documents, the intranet webpage/websites may be formatted so that company reports are organized on one webpage and personal documents (e.g., pictures) are organized on a personal webpage, thereby allowing the company to more easily aggregate company reports. Developers of Enterprise Portal servers can use the invention to automatically format the layout of portals for different information streams. In addition, makers of collaborative software can use the invention to improve the presentation of data shared in workgroups as well as to generate web documents, and end-users can use it to quickly publish and share data on the Web.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

Figure 20:
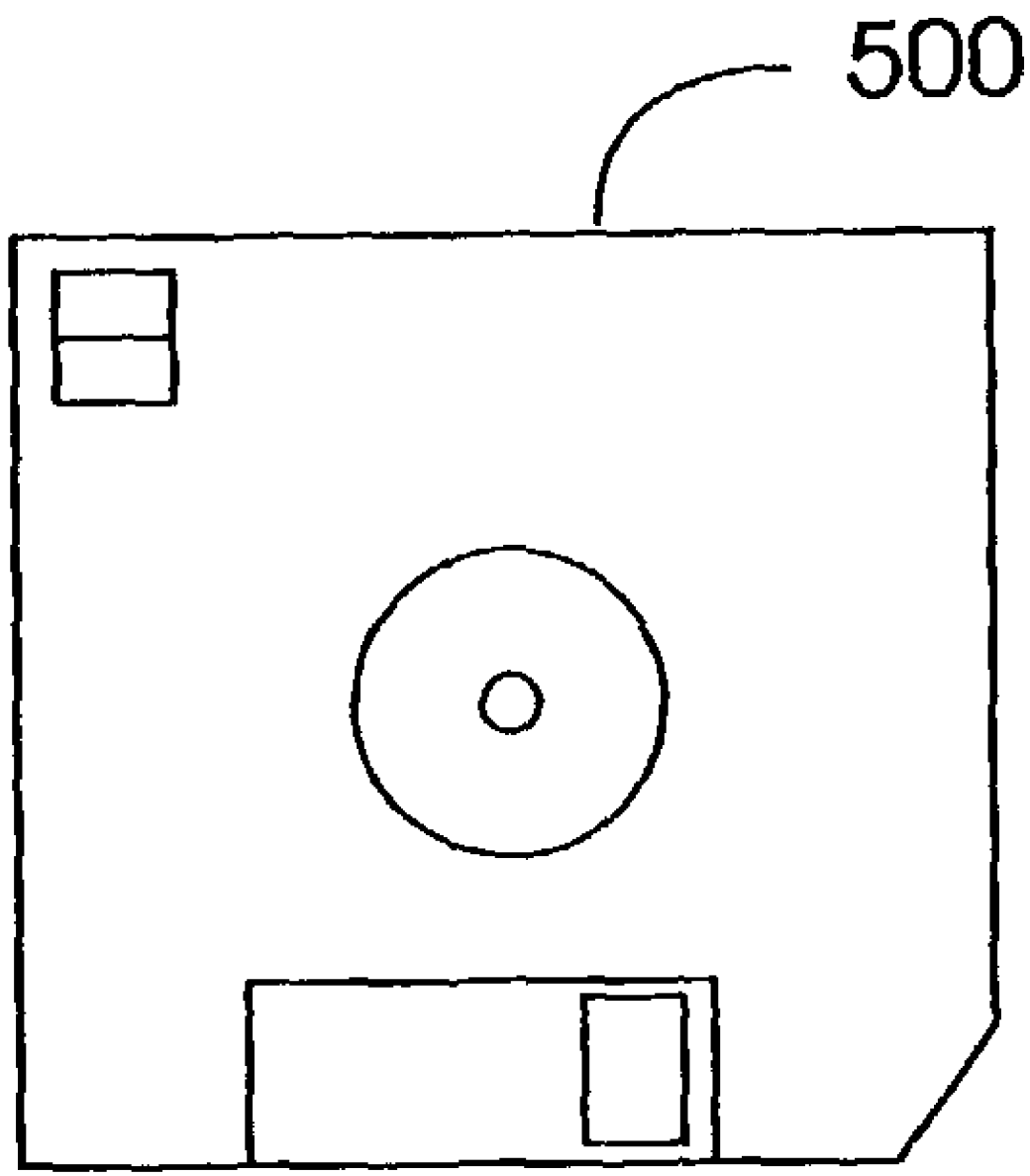
FIG. 20 shows a computer program product for storing executable program code that may be used in implementing the methods herein.

In preferred embodiments of the invention, there is provided media encoded with executable program code to effect any of the methods described herein. This code contains executable instructions that may reside, for example, in the random access memory (RAM) of a processor, or on a hard drive or optical drive of a processor. The instructions may be stored on a magnetic or optical disk or diskette, a disk drive, magnetic tape, electronic read-only memory, or other appropriate data storage device. (For example, see the computer program product 500 shown in FIG. 20.) In preferred embodiments, this program code may be read by a digital processing apparatus such as a processor or computer for performing any one or more of the methods disclosed herein.

What is claimed is:

1. A product comprising a computer-readable medium that tangibly embodies a computer executable program thereon for automatically laying out, on at least one webpage, information in pre-existing documents, the program including instructions for:

(a) without user intervention, a particular template from a library of templates, wherein text is extracted from the pre-existing documents themselves, the extracted text being extracted to determine a topic of the pre-existing documents, wherein said particular template is selected according to the determined topic, and wherein the documents are selected from the group consisting of a publication list, a project list, work activities, a resume, an employee directory, workgroup contacts, workgroup projects, a project report, a journal paper, a version history of source code files, memos, meeting notes, and sales reports;

(b) dynamically adapting said particular template according to the determined topic; and (c) modifying a pre-existing webpage so that the modified webpage is based on said dynamically adapted template and includes text extracted from the pre-existing documents themselves.

2. The method of claim 1, wherein only a portion of the extracted text is integrated into the webpage.

3. A computer-implemented method of constructing a webpage, comprising:

extracting text from each of a plurality of pre-existing text-based documents, the text being extracted from the pre-existing documents themselves;

analyzing the extracted text to determine the contents of the documents, in order to identify a topic of the documents;

without user intervention, from a library of templates according to the identified topic of the documents;

generating at least one webpage from the selected template, said at least one webpage including text extracted from each of the plurality of documents, wherein said selecting is performed by computer program code residing within at least one processor; and storing said at least one generated webpage on a webserver from which said at least one generated webpage can be accessed by a client device.

4. The method of claim 1, wherein a hyperlink to the document is placed on the webpage.

5. The method of claim 1, wherein the webpage is based on a corporate profile template.

6. The method of claim 1, further comprising redesigning templates in the library of templates to form a modified library of templates, thereby automatically changing a website to a new design that reflects the modified library.

7. The method of claim 3, wherein only a portion of the text in the documents is used in generating said at least one webpage.

8. The method of claim 3, comprising merging the selected template with a default template to form a completed template from which said at least one webpage is generated.

9. The method of claim 8, said merging including a stepwise process in which rules in the default template are compared with corresponding rules in the selected template.

10. The method of claim 9, wherein rules with the highest priority are selected to be included in the completed template.

11. The method of claim 8, wherein the default template has been previously generated with the method of claim 3.

12. The method of claim 3, comprising merging a plurality of selected templates to form a completed template from which said at least one webpage is generated.

13. The method of claim 3, wherein said selecting depends in part on preferences input by a user.

14. The method of claim 3, wherein said selecting is performed without input from a user after said extracting.

15. The method of claim 3, wherein the extracted text is integrated into a single web page.

16. The method of claim 3, wherein the library of templates resides on a template server, and the documents are provided to a client machine that communicates with the template server.

17. The method of claim 16, wherein said at least one webpage is generated on a server that communicates with both the template server and the client machine.

18. The method of claim 3, wherein a plurality of webpages are generated to form a website.

19. The method of claim 18, wherein hyperlinks are formed on the webpages to link the webpages to each other.

20. The method of claim 3, wherein the documents are selected from the group consisting of a publication list, a project list, work activities, a resume, an employee directory, workgroup contacts, workgroup projects, a project report, a journal paper, a version history of source code files, memos, meeting notes, and sales reports.

21. The method of claim 3, wherein the template library includes a template for a publication list.

22. The method of claim 3, wherein the template library includes a template for an employee directory.

23. The method of claim 3, wherein the documents are stored in a database.

24. The method of claim 3, comprising scanning the documents for text that suggests a topic.

25. The method of claim 3, comprising using multiple templates to create multiple views of a website, so that different views are presented to different users of the website.

26. The method of claim 3, comprising adding the extracted text to an existing website.

27. The method of claim 3, wherein the documents are provided by a user who copies the documents from a client machine.

28. The method of claim 3, wherein at least one hyperlink to the documents is placed on said at least one webpage.

29. The method of claim 3, wherein said at least one webpage is based on a corporate profile template.

30. The method of claim 3, further comprising redesigning templates in the library of templates to form a modified library of templates, thereby automatically changing a website to a new design that reflects the modified library.

31. A product comprising a computer-readable medium that tangibly embodies a computer executable program thereon for:
   extracting text from each of a plurality of pre-existing text-based documents, the text being extracted from the pre-existing documents themselves;
   analyzing the extracted text to determine the contents of the documents, in order to identify a topic of the documents;
   without user intervention, from a library of templates according to the identified topic of the documents;
   generating at least one webpage from the selected template, said at least one webpage including text extracted from each of the plurality of documents; and
   storing said at least one generated webpage on a webserver from which said at least one generated webpage can be accessed by a client device.

32. The product of claim 31, the program further including instructions for merging the selected template with a default template to form a completed template that is used to generate said at least one webpage.

33. The product of claim 31, wherein said selecting is performed without input from a user after said extracting.

34. The product of claim 31, wherein the extracted text is integrated into a single webpage.

35. A computer system, comprising:
   at least one processor; and
   a memory in electronic communication with said at least one processor, in which said memory includes software instructions designed to enable the computer system to perform the acts of:
   extracting text from each of a plurality of pre-existing text-based documents, the text being extracted from the pre-existing documents themselves;
   analyzing the extracted text to determine the contents of the documents, in order to identify a topic of the documents;
   without user intervention, from a library of templates according to the identified topic of the documents;
   generating at least one webpage from the selected template, said at least one webpage including text extracted from each of the plurality of documents; and
   storing said at least one generated webpage on a webserver from which said at least one generated webpage can be accessed by a client device.

36. The system of claim 35, said at least one processor including a template server and a client machine that communicates with the template server, wherein the library of templates resides on the template server, and the documents are provided to the client machine.

37. The system of claim 36, wherein said at least one webpage is generated on a server that communicates with both the template server and the client machine.

* * * * *

UNITED STATES PATENT AND TRADEMARK OFFICE
CERTIFICATE OF CORRECTION

PATENT NO. : 7,747,941 B2
APPLICATION NO. : 10/323147
DATED : June 29, 2010
INVENTOR(S) : C. Campbell et al.

It is certified that error appears in the above-identified patent and that said Letters Patent is hereby corrected as shown below:

In Column 11, line 64, Claim 1, after "intervention," add --automatically selecting--
    In Column 12, line 24, Claim 3, after "intervention," add --selecting a template--
    In Column 14, line 1, Claim 31, after "intervention," add --selecting a template--
    In Column 14, line 28, Claim 35, after "intervention," add --selecting a template--

Signed and Sealed this

Tenth Day of August, 2010

David J. Kappos
*Director of the United States Patent and Trademark Office*